(12) United States Patent
Heu

(10) Patent No.: US 9,182,570 B2
(45) Date of Patent: Nov. 10, 2015

(54) FISH EYE LENS SYSTEM AND PHOTOGRAPHING APPARATUS INCLUDING THE SAME

(71) Applicant: SAMSUNG ELECTRONICS CO., LTD., Suwon-si, Gyeonggi-do (KR)

(72) Inventor: Min Heu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 13/681,660

(22) Filed: Nov. 20, 2012

(65) Prior Publication Data

US 2013/0235467 A1    Sep. 12, 2013

(30) Foreign Application Priority Data

Mar. 9, 2012  (KR) .................. 10-2012-0024501

(51) Int. Cl.
| | | |
|---|---|---|
| *G02B 15/14* | (2006.01) | |
| *G02B 13/00* | (2006.01) | |
| *G02B 13/06* | (2006.01) | |
| *G02B 13/18* | (2006.01) | |

(52) U.S. Cl.
CPC ............ *G02B 13/00* (2013.01); *G02B 13/06* (2013.01); *G02B 13/18* (2013.01); *G02B 15/14* (2013.01)

(58) Field of Classification Search
CPC .................................................. G02B 15/177
USPC ........................................................ 359/684
See application file for complete search history.

(56) References Cited

U.S. PATENT DOCUMENTS

| | | |
|---|---|---|
| 5,434,713 A | 7/1995 | Sato |
| 6,844,991 B2 | 1/2005 | Mizuguchi |
| 6,987,623 B2 | 1/2006 | Shibayama |
| 7,023,628 B1 | 4/2006 | Ning |
| 7,046,458 B2 | 5/2006 | Nakayama |
| 7,095,569 B2 | 8/2006 | Rege et al. |

(Continued)

FOREIGN PATENT DOCUMENTS

| | | |
|---|---|---|
| EP | 1 956 405 A1 | 8/2008 |
| JP | 2009-271165 A | 11/2009 |

OTHER PUBLICATIONS

Extended European Search Report issued for EP 13158271.0 (May 10, 2013).

*Primary Examiner* — James Jones
(74) *Attorney, Agent, or Firm* — Drinker Biddle & Reath LLP

(57) ABSTRACT

A fish eye lens system and a photographing apparatus including the same, the fish eye lens system including, in an order from an object side to an image side: a first lens group having a negative refractive power; an aperture stop; and a second lens group having a positive refractive power, wherein the first lens group includes, in the order from the object side to the image side, a (1-A)-th lens group having a negative refractive power, a (1-B)-th lens group having a negative refractive power, and a (1-C)-th lens group including at least one positive lens, and wherein the (1-B)-th lens group is moved to perform focusing.

14 Claims, 12 Drawing Sheets

(56) References Cited

U.S. PATENT DOCUMENTS

| | | |
|---|---|---|
| 7,161,746 B2 * | 1/2007 | Mizuguchi .................... 359/749 |
| 7,173,776 B2 | 2/2007 | Tada et al. |
| 7,283,312 B2 | 10/2007 | Kawada |
| 7,317,581 B2 | 1/2008 | Ito et al. |
| 7,554,753 B2 | 6/2009 | Wakamiya |
| 7,869,141 B2 | 1/2011 | Ning |
| 2007/0047096 A1 | 3/2007 | Ito et al. |
| 2010/0073776 A1 * | 3/2010 | Suzuki .......................... 359/682 |
| 2010/0277816 A1 | 11/2010 | Kweon et al. |
| 2011/0164324 A1 | 7/2011 | Okumura |

* cited by examiner

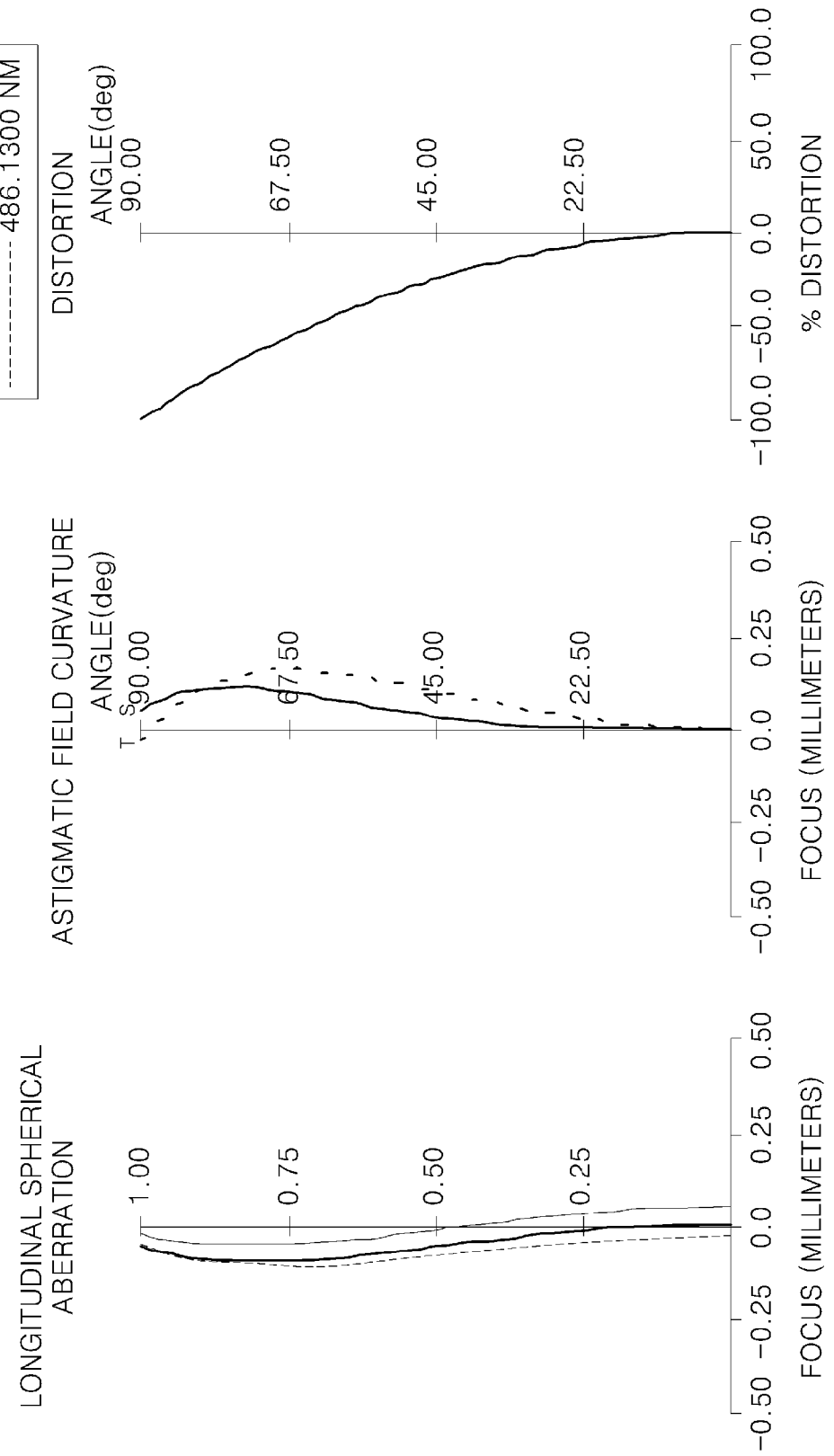

FISH EYE LENS SYSTEM AND PHOTOGRAPHING APPARATUS INCLUDING THE SAME

CROSS-REFERENCE TO RELATED PATENT APPLICATION

This application claims the benefit of Korean Patent Application No. 10-2012-0024501, filed on Mar. 9, 2012, in the Korean Intellectual Property Office, the disclosure of which is incorporated herein in its entirety by reference.

BACKGROUND

Various embodiments relate to a fish eye lens system and a photographing apparatus including the same.

Digital still cameras (DSCs) including a solid state imaging device such as a charge coupled device (CCD) or a complementary metal-oxide semiconductor (CMOS), and digital video cameras (DVCs) are widely used. As such cameras become more popular, demands for single focal lenses, such as telephoto lenses or wide angle lenses, are also increasing. In addition, fish eye lenses having a very large viewing angle, perhaps about 180°, are widely used for obtaining artistic expression by advanced camera users.

Fish eye lenses for photographing must have high resolution that is suitable for high definition of digital cameras and simultaneously should be compact for easy carrying.

In addition, digital camera users demand fast auto-focusing for capturing a moving picture. Thus, a focusing lens group needs to be light so that focusing for a moving picture can be performed quickly and easily.

SUMMARY

An embodiment of the invention provides a small-sized fish eye lens system that may perform focusing quickly.

According to an embodiment, there is provided a fish eye lens system including, in an order from an object side to an image side: a first lens group having a negative refractive power; an aperture stop; and a second lens group having a positive refractive power, wherein the first lens group includes, in the order from the object side to the image side, a (1-A)-th lens group having a negative refractive power, a (1-B)-th lens group having a negative refractive power, and a (1-C)-th lens group including at least one positive lens, and wherein the (1-B)-th lens group is moved to perform focusing.

The (1-A)-th lens group may include one lens having a negative refractive power.

The (1-A)-th lens group may satisfy the following Equation:

$$0.5 < \frac{|Y_{G1}|}{Y_{Image}} < 2.0,$$

$$0.1 < \left|\frac{f_{1-A}}{L}\right| < 0.5$$

where $Y_{image}$ is the height of a principal ray having a viewing angle of 180° at a photographing plane when an object distance is at infinity, $Y_{G1}$ is a height of a principal ray having a viewing angle of 180° at a first lens surface of the object side of the (1-A)-th lens group, $f_{1-A}$ is the focal length of the (1-A)-th lens group, and L is the distance from the first lens surface on the object side of the (1-A)-th lens group to the image plane.

The (1-B)-th lens group may satisfy the following Equation:

$$0.2 < |(1-m_B^2) \cdot m_R^2| < 4.0$$

where $m_B$ is the combined magnification of the (1-B)-th lens group when the viewing angle of the fish eye lens is 180°, and $m_R$ is the combined magnification of the (1-C)-th lens group and the second lens group.

The (1-B)-th lens group may include a lens having a negative refractive power.

The second lens group may include at least one aspherical lens.

The distance between the first lens group and the second lens group may be decreased during zooming from a wide angle position to a telephoto position.

When the fish eye lens system performs zooming, the (1-A)-th lens group, the (1-B)-th lens group, and the (1-C)-th lens group may be simultaneously moved.

When the fish eye lens system performs zooming, the (1-A)-th lens group and the (1-C)-th lens group may be simultaneously moved, and the (1-B)-th lens group may be independently moved.

The (1-A)-th lens group may include a first lens that is a meniscus lens with a convex side toward the object side and has a negative refractive power.

The (1-B)-th lens group may include a second lens that is a meniscus lens with a convex side toward the object side and has a negative refractive power.

The (1-B)-th lens group may include a second lens that includes two concave sides and has a negative refractive power.

The (1-C)-th lens group may include a lens having a positive refractive power and a lens having a negative refractive power.

The (1-C)-th lens group may include a cemented lens including a lens having a positive refractive power and a lens having a negative refractive power.

The second lens group may include a cemented lens including a lens having a positive refractive power and a lens having a negative refractive power or a cemented lens including a lens having a negative refractive power and a lens having a positive refractive power.

According to another embodiment, there is provided a photographing apparatus including: a fish eye lens system; and an imaging device that receives light passed through the fish eye lens system, wherein the fish eye lens system includes, in an order from an object side to an image side: a first lens group having a negative refractive power; an aperture stop; and a second lens group having a positive refractive power, wherein the first lens group includes, in the order from the object side to the image side, a (1-A)-th lens group having a negative refractive power, a (1-B)-th lens group having a negative refractive power, and a (1-C)-th lens group including at least one positive lens, and wherein the (1-B)-th lens group is moved to perform focusing.

BRIEF DESCRIPTION OF THE DRAWINGS

The above and other features and advantages will become more apparent from the following detailed description of exemplary embodiments with reference to the attached drawings in which:

FIGS. 7A through 7C are charts of aberration of the fish eye lens system of FIG. 6 at a wide angle position, a middle position, and a telephoto position, respectively.

DETAILED DESCRIPTION

Figure 1:
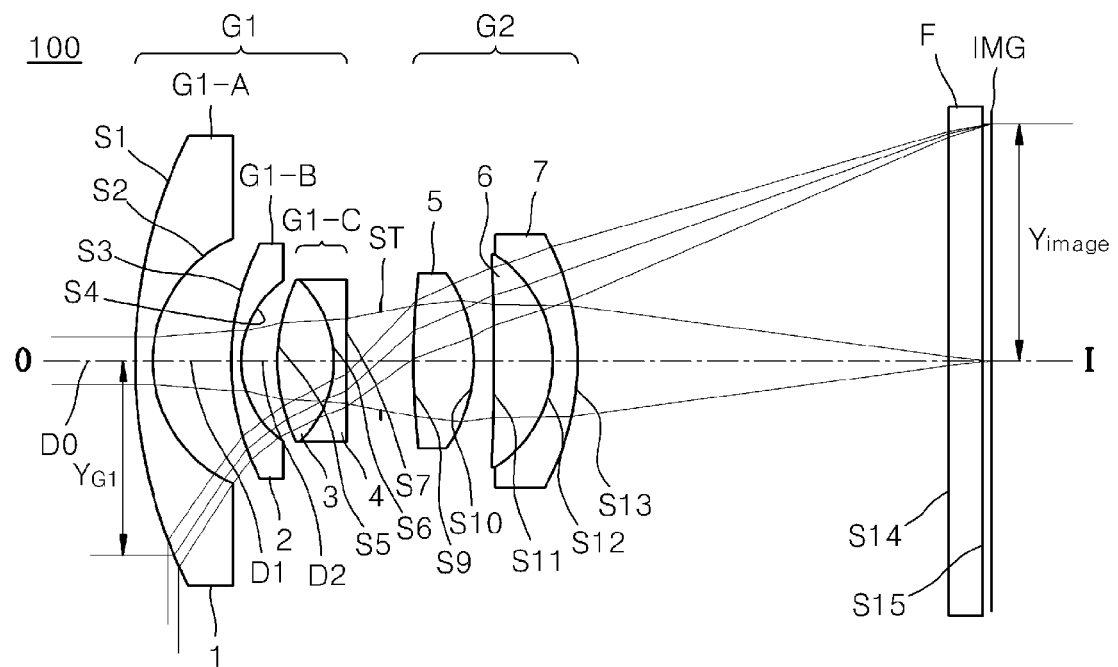
FIG. 1 is a cross-sectional view of a fish eye lens system according to an embodiment.

Referring to FIG. 1, the fish eye lens system 100 may include, from an object side O, a first lens group G1 having a negative refractive power, an aperture stop ST, and a second lens group G2 having a positive refractive power.

Figure 2:
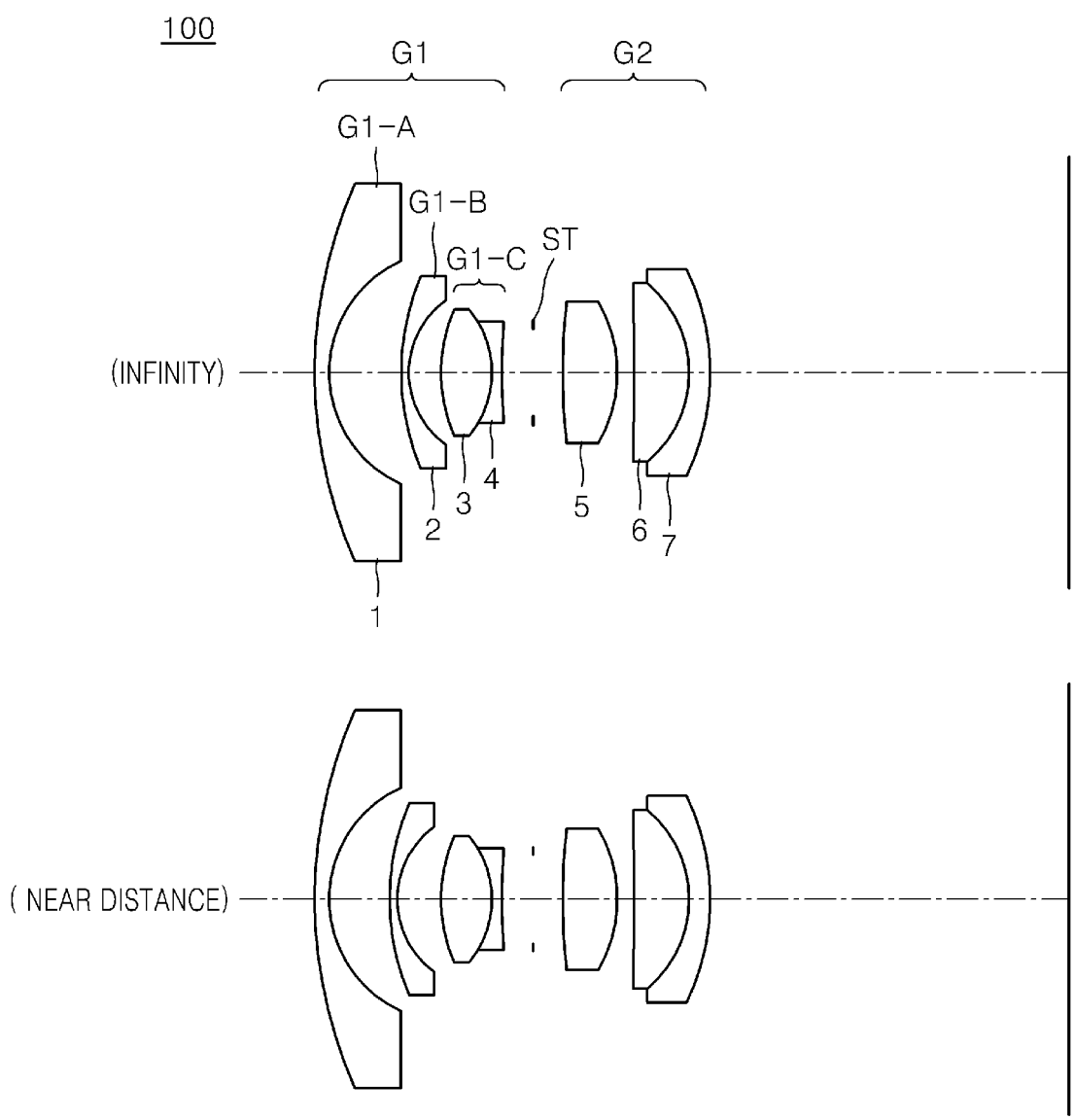
FIG. 2 is a cross-sectional view of a focusing operation of the fish eye lens system illustrated in FIG. 1.

The first lens group G1 may include a (1-A)-th lens group G1-A having a negative refractive power, a (1-B)-th lens group G1-B having a negative refractive power, and a (1-C)-th lens group G1-C including at least one positive lens. The (1-B)-th lens group G1-B may be moved to perform focusing. The lens group that performs focusing may be miniaturized to perform focusing quickly. For example, the (1-B)-th lens group G1-B may include one lens. For example, the (1-B)-th lens group G1-B may include one lens having a negative refractive power. In this way, a small number of lens groups that are moved during focusing for correcting an image plane according to a change in an object distance, is configured to perform focusing quickly. FIG. 2 is a cross-sectional view of a focusing operation of the fish eye lens system 100 illustrated in FIG. 1.

The fish eye lens system 100 of FIG. 1 may have an ultra-wide angle of about 180°.

In the embodiment of the fish eye lens system 100 illustrated in FIG. 1, the (1-A)-th lens group G1-A may include a first lens 1 that is a meniscus lens with a convex surface toward the object side O and has a negative refractive power. The (1-B)-th lens group G1-B may include a second lens 2 that is a meniscus lens with a convex surface toward the object side O and has a negative refractive power. Focusing may be performed by the (1-B)-th lens group G1-B. The (1-C)-th lens group G1-C may include a third lens 3 having a positive refractive power and a fourth lens 4 having a negative refractive power. The third lens 3 and the fourth lens 4 may be formed as a cemented lens.

The second lens group G2 may include a plurality of lenses. For example, the second lens group G2 may include a fifth lens 5 having a positive refractive power, a sixth lens 6 having a negative refractive power, and a seventh lens 7 having a positive refractive power. The sixth lens 6 and the seventh lens 7 may be formed as a cemented lens. The second lens group G2 may include at least one aspherical surface.

Figure 4:
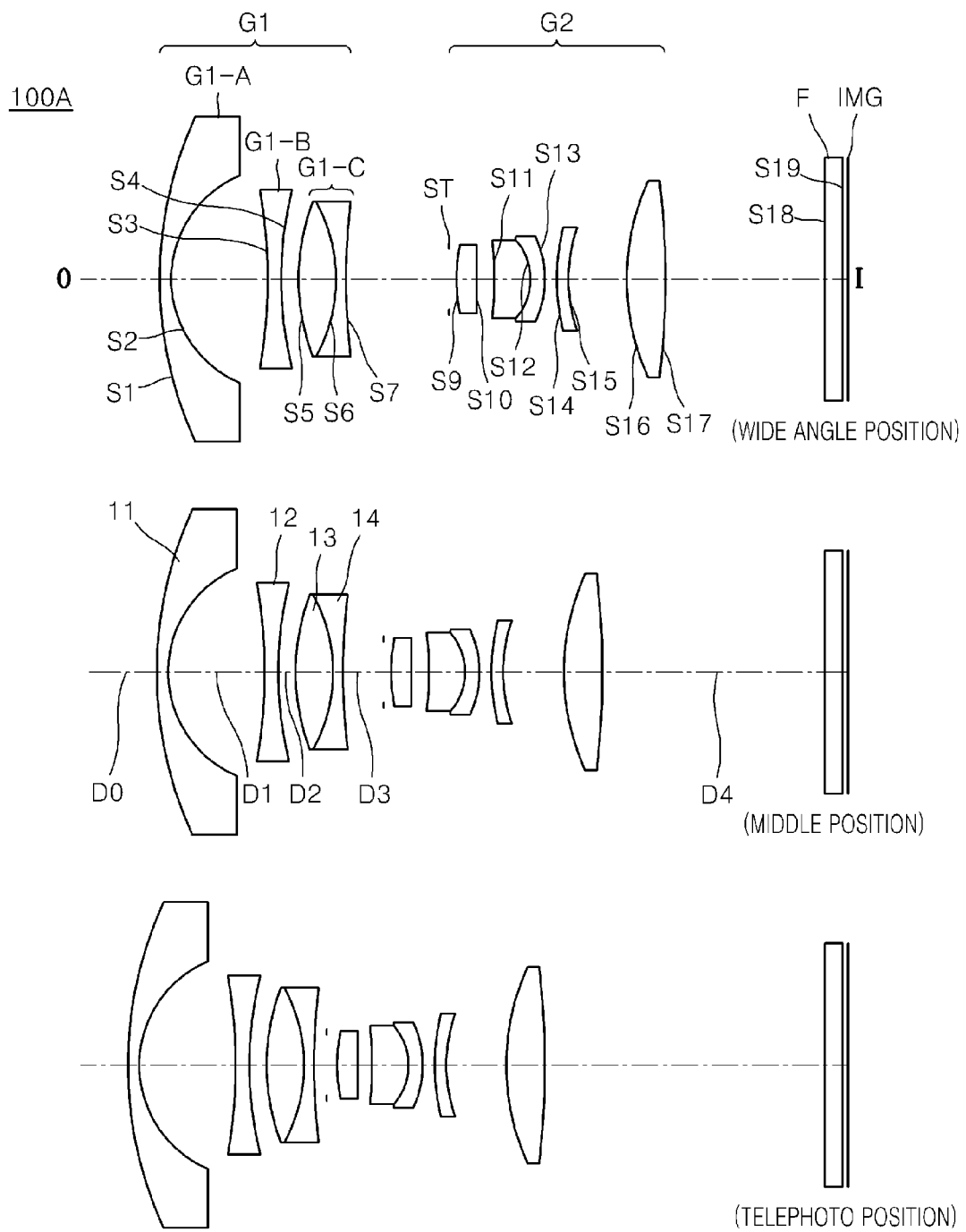
FIG. 4 is a cross-sectional view of a fish eye lens system at a wide angle position, a middle position, and a telephoto position, respectively, according to another embodiment.

FIG. 4 is a cross-sectional view of a fish eye lens system 100A in at a wide angle position, a middle position, and a telephoto position, respectively, according to another embodiment. The fish eye lens system 100A may include, from an object side O, a first lens group G1 having a negative refractive power, an aperture stop ST, and a second lens group G2 having a positive refractive power.

In the fish eye lens system 100A illustrated in FIG. 4, the first lens group G1 may include a (1-A)-th lens group G1-A that may include a first lens 11 that is a meniscus lens with a convex surface toward the object side O and has a negative refractive power, and a (1-B)-th lens group G1-B that may include a second lens 12 that includes bi-concave surfaces and has a negative refractive power. The first lens group G1 may also include a (1-C)-th lens group G1-C that may include a lens 13 having a positive refractive power and a lens 14 having a negative refractive power.

The second lens group G2 may include five lenses, for example, and may include at least one aspherical surface.

Referring still to the embodiment illustrated in FIG. 4, zooming may be performed by moving the first lens group G1 and the second lens group G2. The distance between the first lens group G1 and the second lens group G2 may be decreased during zooming from a wide angle position to a telephoto position. During zooming, the (1-A)-th lens group G1-A, the (1-B)-th lens group G1-B, and the (1-C)-th lens group G1-C may be moved together with respect to the image plane.

Figure 6:
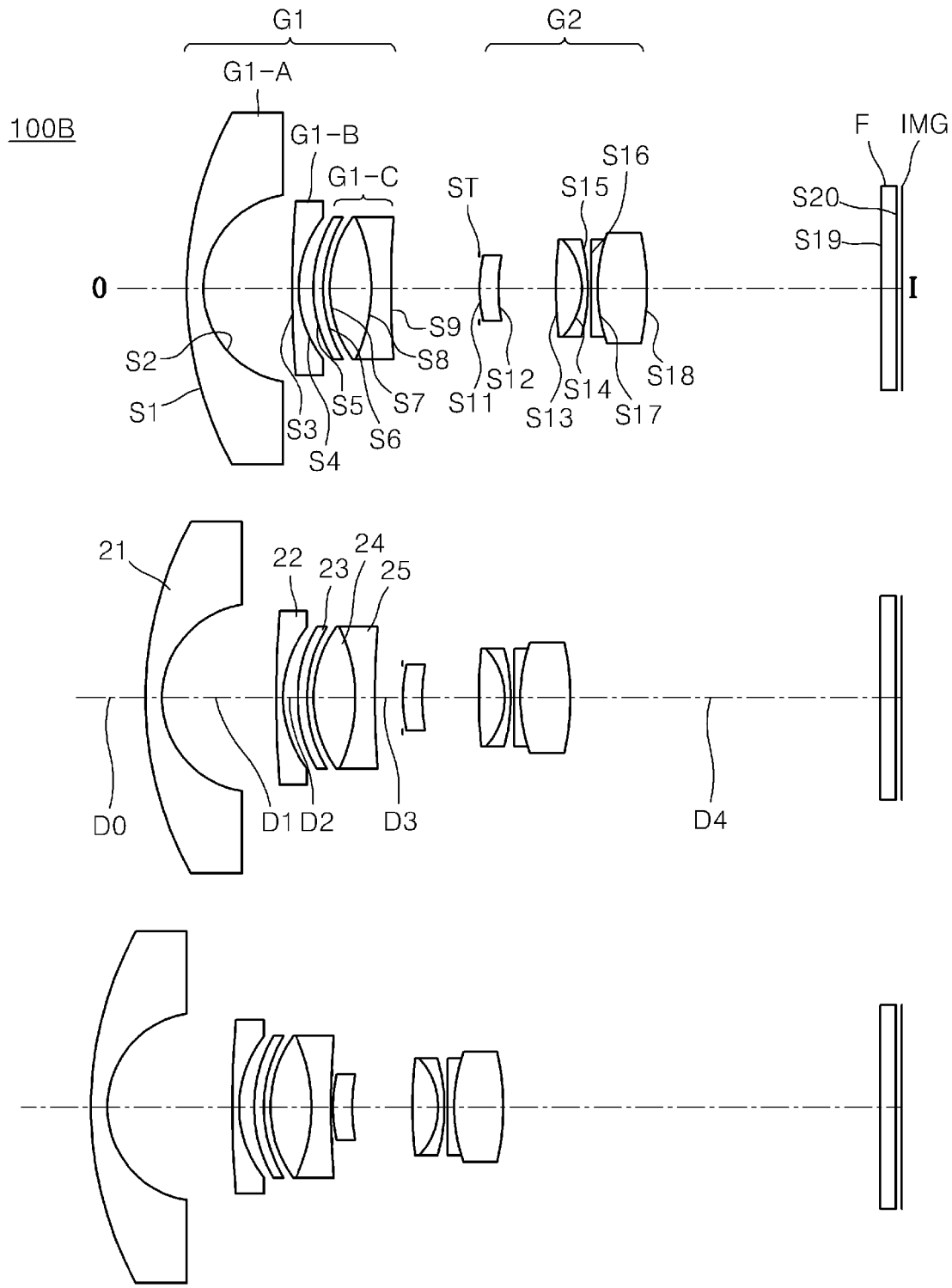
FIG. 6 is a cross-sectional view of a fish eye lens system at a wide angle position, a middle position, and a telephoto position, respectively, according to another embodiment.

FIG. 6 is a cross-sectional view of a fish eye lens system 100B at a wide angle position, a middle position, and a telephoto position, respectively, according to another embodiment. The fish eye lens system 100B may include, from an object side O, a first lens group G1 having a negative refractive power, an aperture stop ST, and a second lens group G2 having a positive refractive power.

Referring to the fish eye lens system 100B illustrated in FIG. 6, the first lens group G1 may include, from an object side O, a (1-A)-th lens group G1-A having a negative refractive power, a (1-B)-th lens group G1-B having a negative refractive power, and a (1-C)-th lens group G1-C including at least one positive lens.

The (1-A)-th lens group G1-A may include a first lens 21 that is a meniscus lens with a convex surface toward the object side O and has a negative refractive power, and the (1-B)-th lens group G1-B may include a second lens 22 that is a meniscus lens with a convex surface toward the object side O and has a negative refractive power.

The (1-C)-th lens group G1-C may include one lens having a positive refractive power and a plurality of lenses each having a negative refractive power. For example, the (1-C)-th lens group G1-C may include a lens 23 having a negative refractive power, a lens 24 having a positive refractive power, and a lens 25 having a negative refractive power. The (1-C)-th lens group G1-C may include a cemented lens including a positive lens and a negative lens. The second lens group G2 may include five lenses and may include at least one aspherical surface.

In the present embodiment, zooming may be performed such that the distance between the first lens group G1 and the second lens group G2 varies. During zooming, the (1-A)-th lens group G1-A, the (1-B)-th lens group G1-B, and the (1-C)-th lens group G1-C may be moved simultaneously with respect to the image plane. Alternatively, during zooming, the (1-A)-th lens group G1-A and the (1-C)-th lens group G1-C may be moved simultaneously and the (1-B)-th lens group G1-B may be independently moved. Thus, good optical performance of the fish eye lens system 100B during zooming may be achieved.

The (1-A)-th lens group G1-A according to the present embodiment may include one lens having a negative refractive power and may satisfy the following equations:

$$0.5 < \frac{|Y_{G1}|}{Y_{Image}} < 2.0 \quad (1)$$

$$0.1 < \left|\frac{f_{1-A}}{L}\right| < 0.5, \quad (2)$$

where $Y_{image}$ is the height of a principal ray having a viewing angle of 180° at a photographing plane when an object distance is at infinity, $Y_{G1}$ is the height of the principal ray having a viewing angle of 180° at a first lens surface of the object side O of a (1-A)-th lens group G1-A, $f_{1-A}$ is the focal length of the (1-A)-th lens group G1-A, and L is the distance from the first lens surface of the object side O of the (1-A)-th lens group G1-A to the image plane. In detail, L is the distance from the first lens surface on the object side O of the (1-A)-th lens group G1-A when the first lens 21 is a single focal lens, and L is the distance from the first lens surface on the object side O of the (1-A)-th lens group G1-A when the first lens 21 is a zooming lens and a viewing angle of the zooming lens is 180°. Equation 1 defines the size of the fish eye lens system 100B and defines the ratio of the image height at the image plane to the height of light at the first lens surface of the object side O of the (1-A)-th lens group G1-A when the viewing angle of the fish eye lens system 100B is 180°. $Y_{image}$ is the height of a principal ray having a viewing angle of 180° at a photographing plane on which an image is formed, and $Y_{G1}$ is the height of a principal ray passing through the first lens surface of the object side O of the (1-A)-th lens group G1-A.

When $|Y_{G1}|/Y_{Image}$ is greater than the upper value of Equation 1, the size of the first lens of the fish eye lens system 100B is increased, and it is not easy to achieve miniaturization. On the other hand, when $|Y_{G1}|/Y_{Image}$ is less than the lower value of Equation 1, the refractive power of the first lens group G1 is greatly reduced, and it is not easy to obtain asymmetry required for the fish eye lens system 100B.

Equation 2 defines an optimum condition of the refractive power of the (1-A)-th lens group G1-A regarding the size of the lens system 100B. When $|f_{1-A}/L|$ is greater than an upper value of Equation 2, the refractive power of the first lens group G1 is greatly reduced such that asymmetry required for the fish eye lens system 100B is reduced, and it is not easy to achieve stable optical performance of the fish eye lens system 100B, and it is not easy to obtain a sufficient back focal length required for an interchangeable lens camera. When $|f_{1-A}/L|$ is less than the lower value of Equation 2, the refractive power of the first lens group G1 is greatly increased such that it is not easy to implement a small-sized lens system.

The (1-B)-th lens group may satisfy the following Equation 3:

$$0.2 < |(1-m_B^2) \cdot m_R^2| < 4.0 \quad (3)$$

where $m_B$ is the combined magnification of the (1-B)-th lens group G1-B when the viewing angle of the fish eye lens system 100B is 180°, and $m_R$ is the combined magnification of the (1-C)-th lens group G1-C and the second lens group G2.

In the fish eye lens system 100B having a viewing angle of 180°, as the object distance varies from infinity to a near distance, a large astigmatic field curvature may occur in a direction (−). In addition, the distance between the (1-B)-th lens group G1-B and the (1-C)-th lens group G1-C greatly affects the astigmatic field curvature. When the distance between the (1-B)-th lens group G1-B and the (1-C)-th lens group G1-C is increased, a large astigmatic field curvature may occur in a direction (+). Thus, effective correction of the astigmatic field curvature may be performed when focusing is performed using the (1-B)-th lens group G1-B and thus excellent optical performance of the fish eye lens system 100B at any object distance may be achieved. Equation 3 indicates an astigmatic field curvature correction magnification according to the amount of movement of the (1-B)-th lens group G1-B. When $|(1-m_B^2) \cdot m_R^2|$ is greater than the upper value of Equation 3, it is not easy to perform focusing with precision, and when $|(1-m_B^2) \cdot m_R^2|$ is less than the lower value of Equation 3, the amount of movement of the focusing lens group is greatly increased due to a variation in the object distance, and it is not easy to configure a compact lens system, and a minimum object distance at which photographing may be performed may be increased.

An aspherical lens is introduced to implement a fish eye lens system with a small number of lenses so that occurrence of several aberrations may be suppressed and stable optical performance of the fish eye lens system may be achieved. For example, astigmatism that may adversely affect an ultra-wide angle lens when an aspherical lens is used in the second lens group G2 after the aperture stop ST, may be effectively controlled.

Aspherical surfaces used in the fish eye lens systems 100, 100A, and 100B illustrated in FIGS. 1, 4, and 6, respectively, is defined below.

Assuming that an optical axis direction is based on an x-axis and a direction perpendicular to the optical axis direction is a y-axis and a proceeding direction of light is positive, the aspherical surfaces may be indicated using the following Equation 4:

$$x = \frac{Cy^2}{1+\sqrt{1-(K+1)C^2y^2}} + ay^4 + by^6 + cy^8 + dy^{10} \quad (4)$$

where x is the distance from a vertex of a lens in the optical axis direction, y is the distance in a direction perpendicular to the optical axis, K is a conic constant, a, b, c, and d are aspherical coefficients, and c is a reciprocal (1/R) of the radius of curvature at the vertex of the lens.

The fish eye lens systems 100, 100A, and 100B are implemented in the embodiments illustrated in FIGS. 1, 4, and 6 by using the following designs. Hereinafter, EFL is the whole focal length in units of mm, F no is an F-number, 2w is a viewing angle in units of degree, and * is an aspherical surface. In each of FIGS. 1, 4, and 6, at least one filter F may be disposed closest to the image side I. The filter F may include at least one selected from the group consisting of a low pass filter, an IR-cut filter, and cover glass. However, the fish eye lens systems 100, 100A, and 100B of FIGS. 1, 4, and 6 may be configured without a filter. IMG in FIGS. 1, 4, and 6 indicates the image plane.

<Embodiment 1>

A structure of the fish eye lens system 100 based on design data of a first embodiment is illustrated in FIG. 1, and the following tables 1 and 2 show the design data of the fish eye lens system 10 of FIG. 1. The fish eye lens system 100 of FIG. 1 illustrates an example of a single focal lens system.

EFL: 10.33 mm Fno: 3.64 2w: 180°

TABLE 1

| Number of surface | Radius of curvature (R) | Thickness (Dn) | Refractive index | Abbe's number |
|---|---|---|---|---|
| S0 | Infinity | D0 | | |
| S1 | 31.231 | 1.00 | 1.61800 | 63.4 |
| S2 | 8.000 | D1 | | |
| S3 | 15.601 | 0.60 | 1.72916 | 54.7 |
| S4 | 5.896 | D2 | | |
| S5 | 11.044 | 3.36 | 1.67270 | 32.2 |
| S6 | −6.559 | 0.70 | 1.80450 | 39.6 |

TABLE 1-continued

| S7 | 37.781 | 2.00 | | |
|---|---|---|---|---|
| ST | Infinity | 2.00 | | |
| S9 | 54.473 | 3.50 | 1.58913 | 61.1 |
| S10* | −8.703 | 1.21 | | |

ASP

K: 0.000000
A: 8.556577e−005
B: 1.478136e−006
C: 0.000000e+000
D: 0.000000e+000

| S11 | −107.312 | 3.50 | 1.59349 | 67.0 |
|---|---|---|---|---|
| S12 | −7.600 | 1.40 | 1.84666 | 23.8 |
| S13 | −15.743 | 21.76 | | |
| S14 | Infinity | 2.00 | 1.51680 | 64.2 |
| S15 | Infinity | 0.50 | | |
| IMG | | | | |

The following table 2 shows data regarding variable distances when focusing is performed.

TABLE 2

| Variable distance | Infinite distance | Near distance |
|---|---|---|
| D0 | Infinity | 50 |
| D1 | 4.6 | 3.80 |
| D2 | 2.07 | 2.86 |

Figure 3:
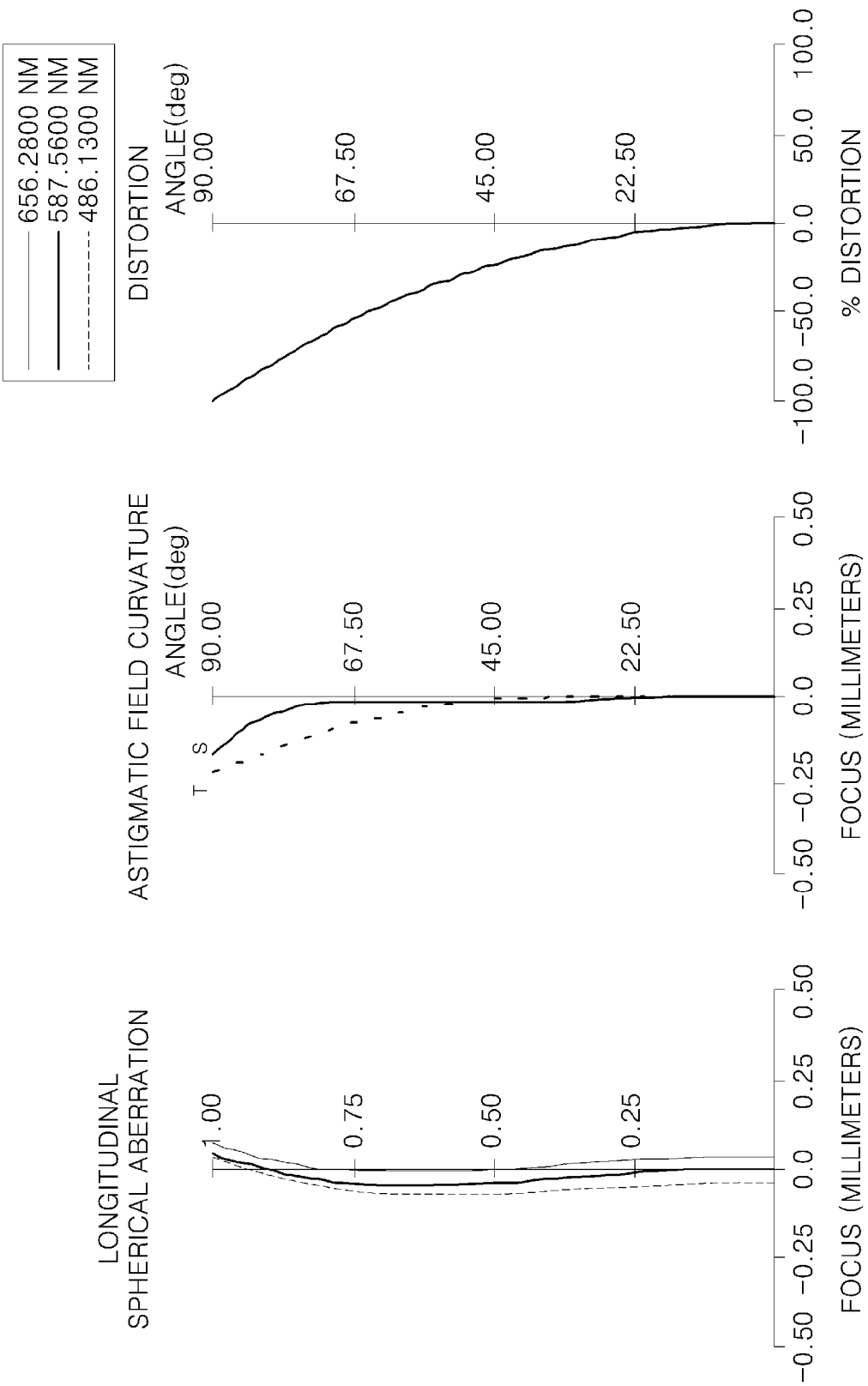
FIG. 3 is a chart of aberration of the fish eye lens system of FIG. 1.

FIG. 3 illustrates longitudinal spherical aberration, astigmatic field curvature, and distortion of the fish eye lens system 100 illustrated in FIG. 1 according to the first embodiment. The astigmatic field curvature includes tangential field curvature T and sagittal field curvature S.

<Embodiment 2>

A structure of the fish eye lens system 100A based on design data of a second embodiment is illustrated in FIG. 4, and the following tables 4 and 5 show the design data of the fish eye lens system 100A of FIG. 4.

f; 10.61~15.00~19.13 mm Fno; 4.4~5.0~5.54 2ω; 180°~116°~88°

TABLE 4

| Number of surface | Radius of curvature (R) | Thickness (Dn) | Refractive index | Abbe's number |
|---|---|---|---|---|
| S0 | Infinity | D0 | | |
| S1 | 47.268 | 1.20 | 1.88300 | 40.8 |
| S2 | 12.915 | D1 | | |
| S3 | −47.880 | 1.20 | 1.55505 | 70.7 |
| S4 | 32.146 | D2 | | |
| S5 | 21.824 | 4.53 | 1.76167 | 25.6 |
| S6 | −18.146 | 1.20 | 1.89211 | 33.3 |

TABLE 4-continued

| S7 | 46.824 | D3 | | |
|---|---|---|---|---|
| ST | Infinity | 1.00 | | |
| S9 | 19.015 | 2.70 | 1.85703 | 40.3 |
| S10 | −46.189 | 1.91 | | |
| S11 | −21.394 | 4.00 | 1.49700 | 81.6 |
| S12 | −7.197 | 1.82 | 1.82967 | 25.6 |
| S13* | −12.846 | 1.41 | | |

ASP

K: 0.000000
A: 6.581029e−018
B: −3.879118e−025
C: −3.071066e−032
D: 0.000000e+000

| S14 | 22.357 | 1.20 | 1.92286 | 20.9 |
|---|---|---|---|---|
| S15 | 13.440 | 7.19 | | |
| S16 | 27.847 | 4.29 | 1.61800 | 63.4 |
| S17 | −94.665 | D4 | | |
| S18 | Infinity | 2.00 | 1.51680 | 64.2 |
| S19 | Infinity | 0.50 | | |
| IMG | | | | |

The following table 5 shows data regarding variable distances when focusing is performed.

TABLE 5

| Variable distance | Wide angle position (Infinite distance) | Middle position (Infinite distance) | Telephoto position (Infinite distance) | Wide angle position (Near distance) | Middle position (Near distance) | Telephoto position (Near distance |
|---|---|---|---|---|---|---|
| D0 | INFINITY | INFINITY | INFINITY | 100 | 100 | 100 |
| D1 | 11.45 | 11.45 | 11.45 | 10.07 | 10.07 | 10.07 |
| D2 | 2.00 | 2.00 | 2.00 | 3.39 | 3.39 | 3.39 |
| D3 | 11.89 | 4.96 | 1.35 | 11.89 | 4.96 | 1.35 |
| D4 | 18.50 | 25.87 | 32.78 | 18.50 | 25.87 | 32.78 |

Figure 5A:
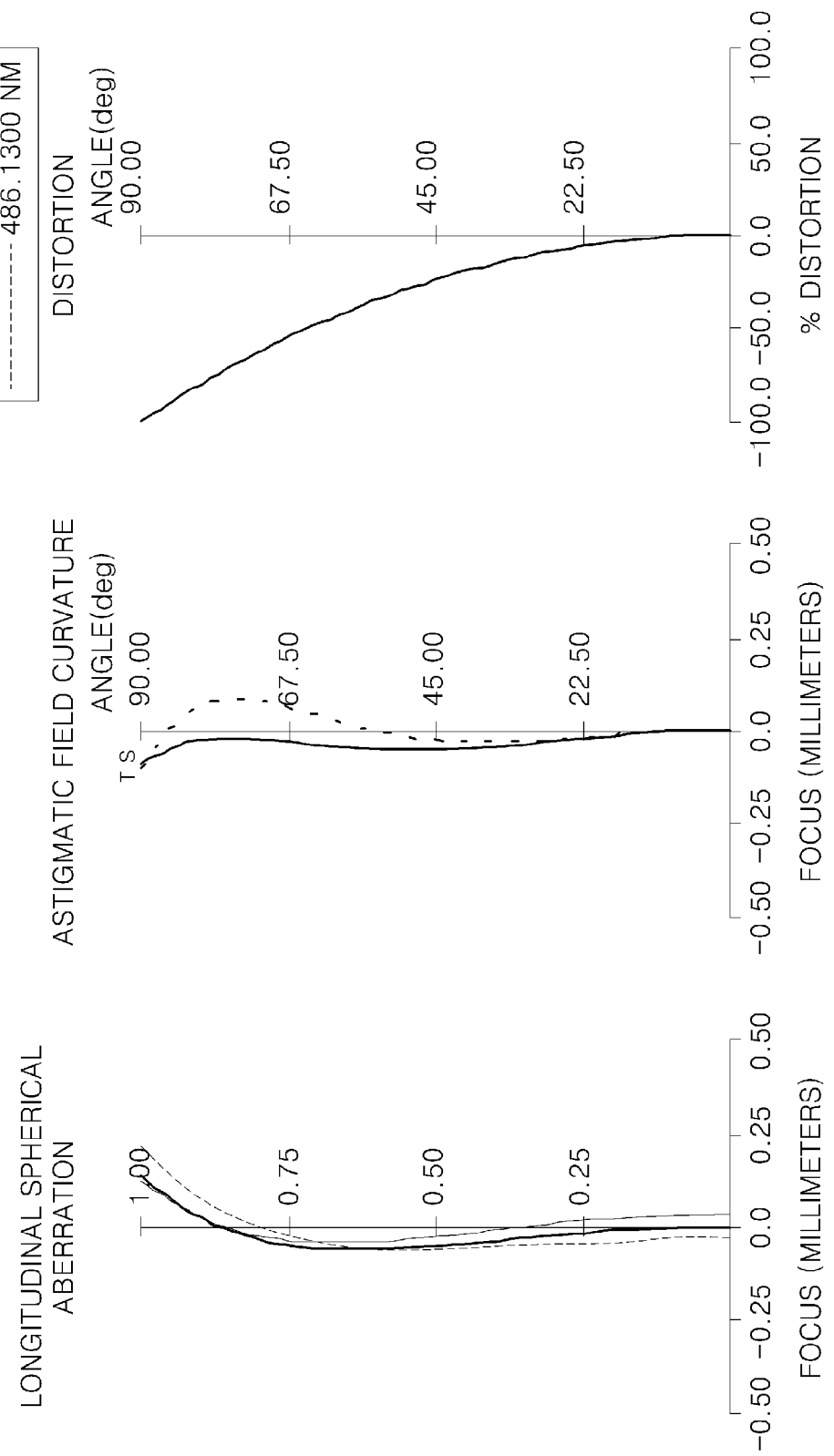
FIGS. 5A through 5C are charts of aberration of the fish eye lens system of FIG. 4 at a wide angle position, a middle position, and a telephoto position, respectively.
Figure 5B:
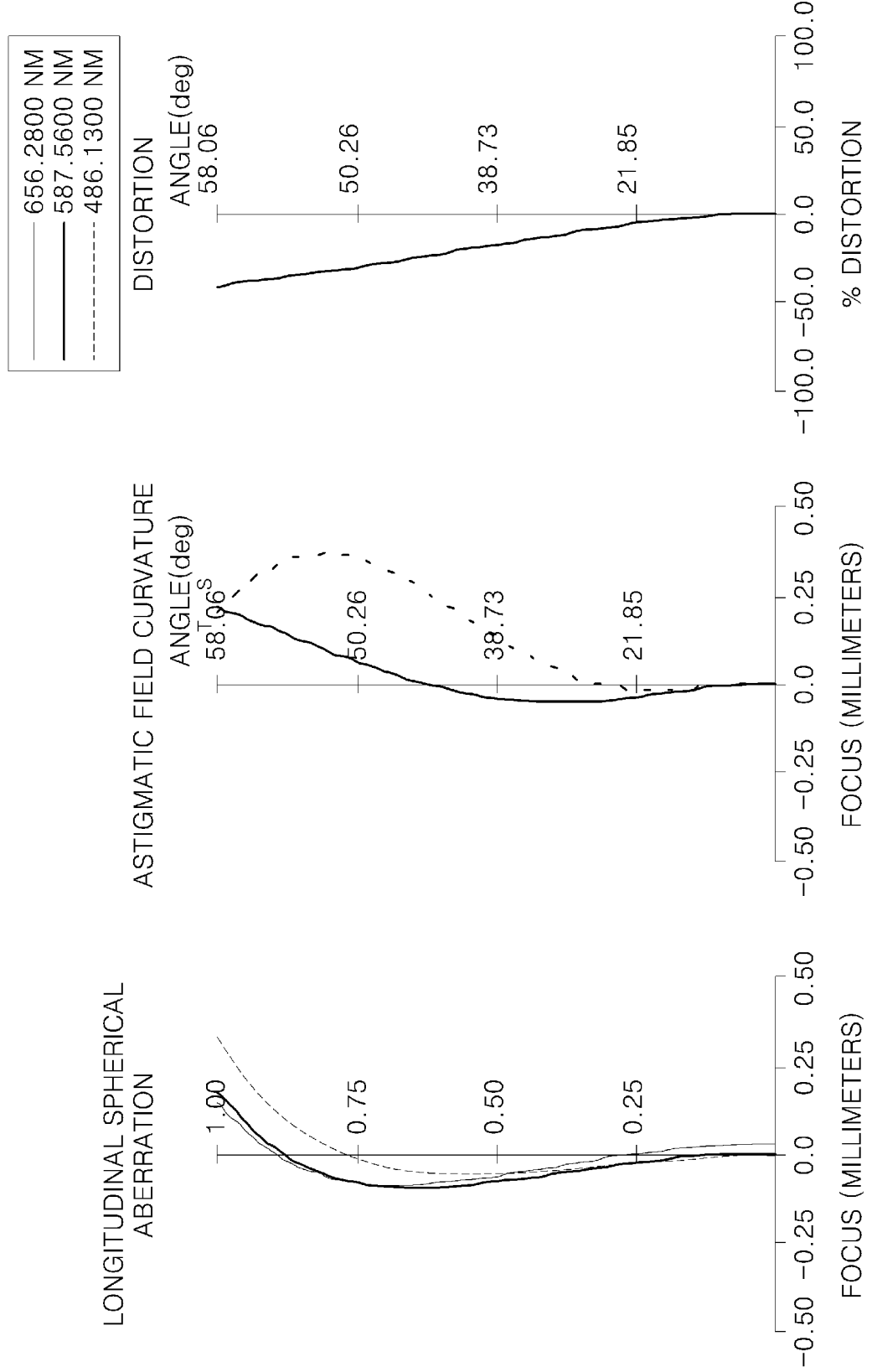
Figure 5C:
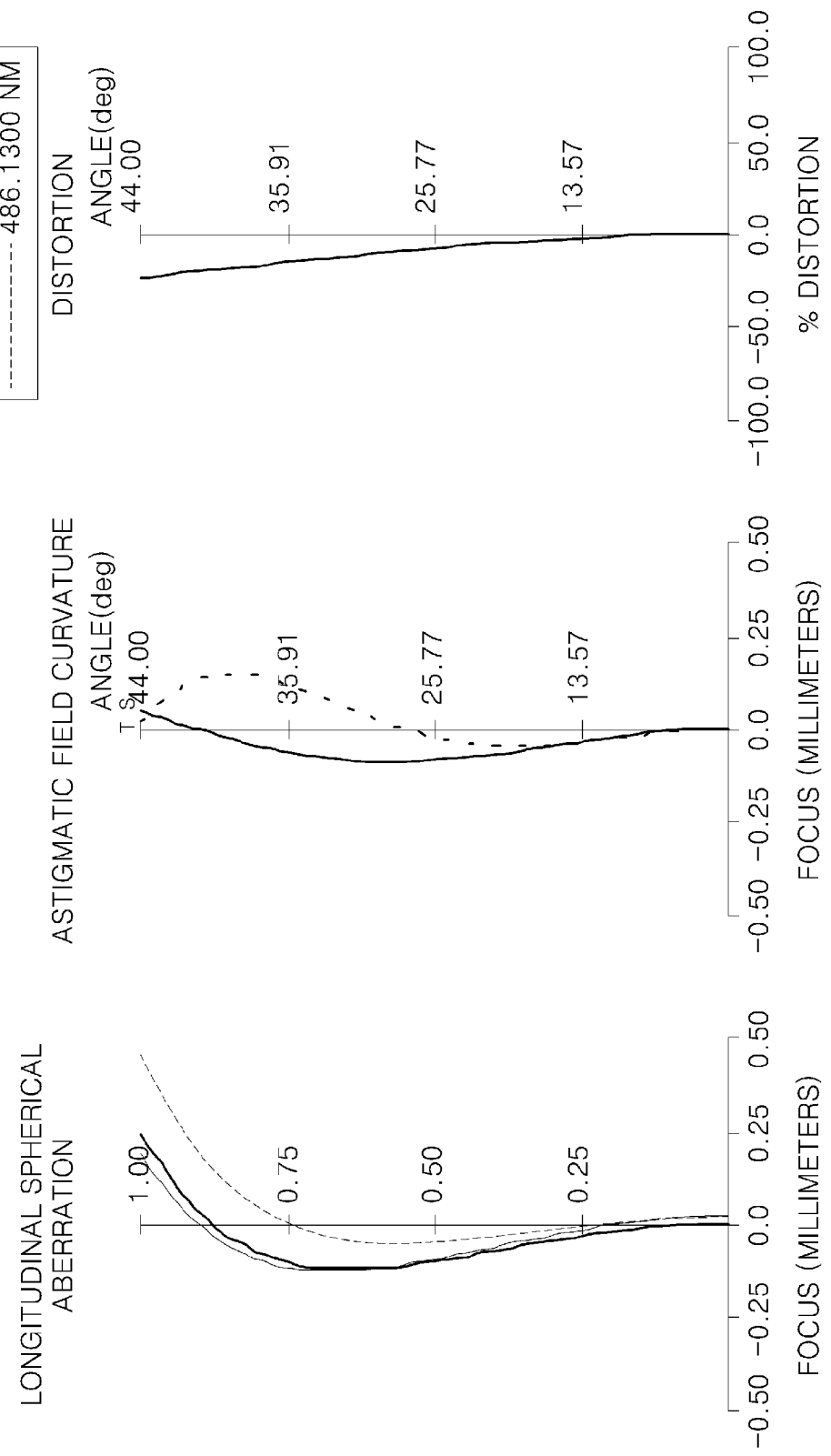

FIGS. 5A through 5C are charts of aberration of the fish eye lens system 100A of FIG. 4 at a wide angle position, a middle position, and a telephoto position, respectively, according to the second embodiment.

<Embodiment 3>

A structure of the fish eye lens system 100B based on design data of a third embodiment is illustrated in FIG. 6, and the following tables 6 and 7 show the design data of the fish eye lens system 100B of FIG. 6.

f; 10.60~15.00~19.10 mm Fno; 3.90~4.51~5.05 2ω; 180°~116°~88°

TABLE 6

| Number of surface | Radius of curvature (R) | Thickness (Dn) | Refractive index | Abbe's number |
|---|---|---|---|---|
| S0 | INFINTY | D0 | | |
| S1 | 52.701 | 2.00 | 1.78756 | 47.8 |
| S2 | 13.203 | D1 | | |
| S3 | 97.058 | 1.20 | 1.70183 | 56.1 |
| S4 | 16.801 | D2 | | |

TABLE 6-continued

| S5 | 19.061 | 1.20 | 1.76644 | 49.9 |
|---|---|---|---|---|
| S6 | 17.888 | 0.69 | | |
| S7 | 15.544 | 5.92 | 1.68181 | 30.1 |
| S8 | −21.652 | 2.54 | 1.87371 | 41.3 |
| S9 | 32.697 | D3 | | |
| ST | Infinity | 0.10 | | |
| S11 | 21.100 | 2.71 | 1.87885 | 41.0 |
| S12 | 40.779 | 8.10 | | |
| S13 | 54.331 | 3.16 | 1.50217 | 80.4 |
| S14 | −11.108 | 1.28 | 1.86738 | 36.2 |
| S15* | −22.670 | 0.10 | | |

ASP

K: −0.751316
A: 7.876882e−016
B: 6.749686e−023
C: −8.758381e−032
D: 0.000000e+000

| S16 | 139.142 | 1.20 | 1.83453 | 31.1 |
|---|---|---|---|---|
| S17 | 24.599 | 0.00 | | |
| S18 | 24.599 | 7.00 | 1.72583 | 54.9 |
| S19 | −35.140 | D4 | | |
| S20 | Infinity | 2.00 | | |
| S21 | Infinity | 0.50 | 1.51680 | 64.2 |
| IMG | | | | |

The following table 7 shows data regarding variable distances when focusing is performed.

TABLE 7

| Variable distance | Wide angle position (Infinite distance) | Middle position (Infinite distance) | Telephoto position (Infinite distance) | Wide angle position (Near distance) | Middle position (Near distance) | Telephoto position (Near distance) |
|---|---|---|---|---|---|---|
| D0 | INFINITY | INFINITY | INFINITY | 100 | 100 | 100 |
| D1 | 12.25 | 15.81 | 17.13 | 11.48 | 15.27 | 16.82 |
| D2 | 2.17 | 2.03 | 2.11 | 3.25 | 2.95 | 2.95 |
| D3 | 12.32 | 4.16 | 0.27 | 12.32 | 4.16 | 0.27 |
| D4 | 32.10 | 42.59 | 52.02 | 32.10 | 42.59 | 52.02 |

Figure 7B:
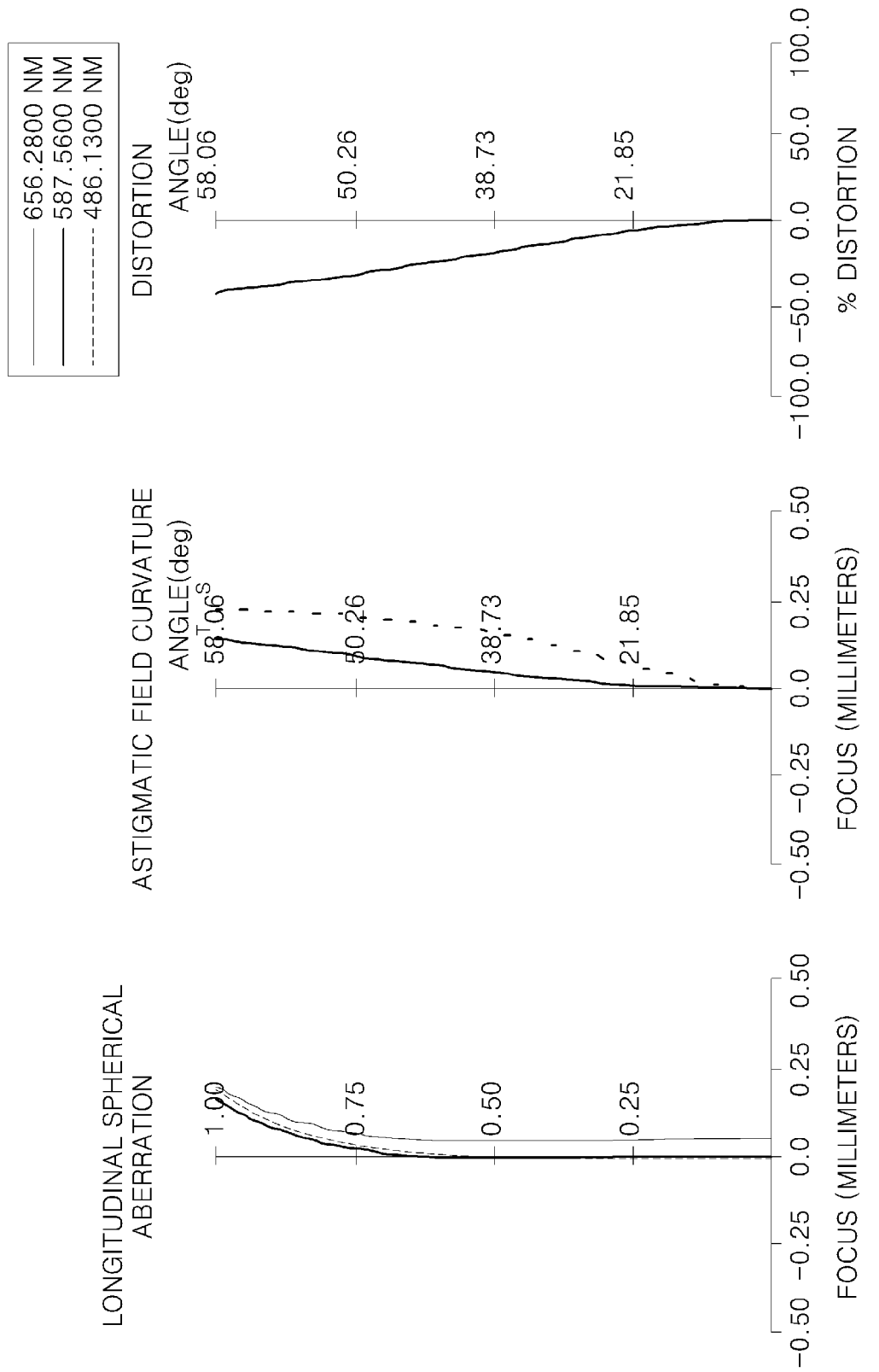
Figure 7C:
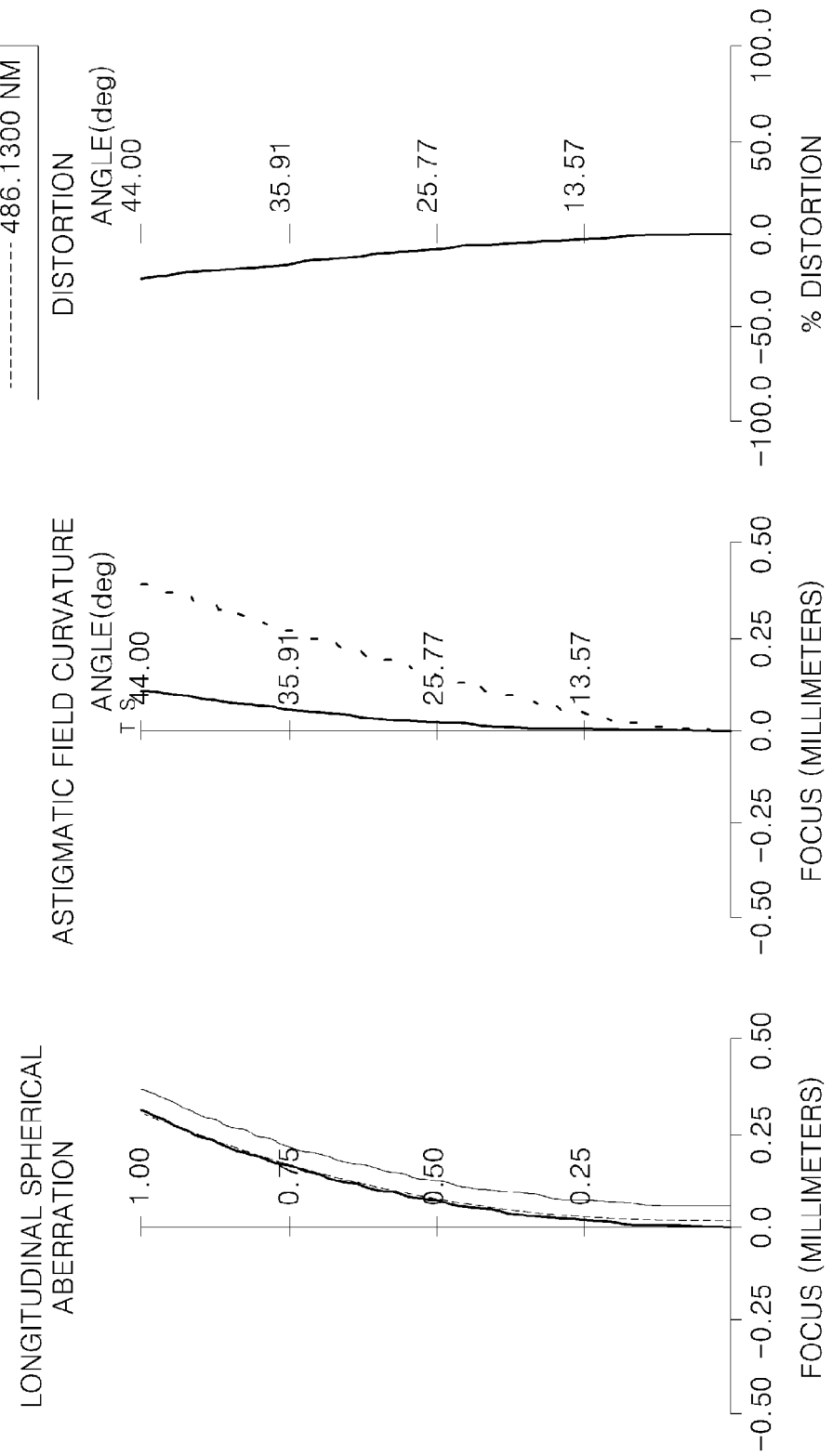

FIGS. 7A through 7C are charts of aberration of the fish eye lens system 100B of FIG. 6 at a wide angle position, a middle position, and a telephoto position, respectively, according to the third embodiment.

The following table shows that the first through third embodiments satisfy the above equations 1 through 3.

| | Equation 1 | Equation 2 | Equation 3 |
|---|---|---|---|
| Embodiment 1 | 0.81 | 0.35 | 2.19 |
| Embodiment 2 | 1.29 | 0.26 | 0.73 |
| Embodiment 3 | 1.63 | 0.23 | 0.85 |

The fish eye lens systems 100, 100A, and 100B of FIGS. 1, 4, and 6, respectively, may be used in an interchangeable lens camera and a digital camera, which uses an imaging device, and the like.

Figure 8:
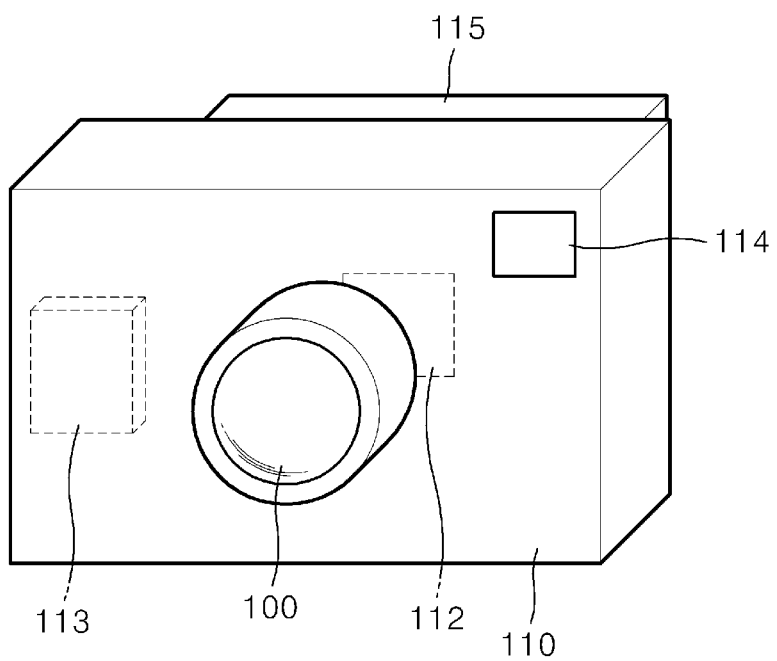
FIG. 8 is a view of a photographing apparatus including a fish eye lens system, according to an embodiment.

FIG. 8 is a view of a photographing apparatus 110 including the fish eye lens system 100, according to an embodiment of the present invention.

Referring to FIG. 8, the photographing apparatus 110 includes the fish eye lens system 100 illustrated in FIG. 1, and an imaging device 112 that receives light passed through the fish eye lens system 100. In addition, the fish eye lens system 100A illustrated in FIG. 4 and the fish eye lens system 100B illustrated in FIG. 6 may be used in the photographing apparatus 110. The photographing apparatus 100 may further include a recording unit on which information corresponding to an image of a subject on which photoelectric conversion is performed by the imaging device 112 is recorded, and a view finder 114 that observes the image of the subject. In addition, the photographing apparatus 100 may further include a display unit 115 on which the image of the subject is displayed. Here, the view finder 114 and the display unit 115 are separately disposed; however, the display unit 115 may be disposed without the view finder 114. The photographing apparatus 110 of FIG. 8 is just an example, and aspects of the invention are not limited thereto, and the fish eye lens systems 100, 100A, and 100B of FIGS. 1, 4, and 6, respectively, may be used in various optical devices including a camera. The fish eye lens systems 100, 100A, and 100B of FIGS. 1, 4, and 6, respectively, are used in a photographing apparatus, such as a digital camera, or the like, so that an ultra-wide angle, high brightness, and small-sized optical device can be implemented.

While the foregoing describes various exemplary embodiments, it will be understood by those of ordinary skill in the art that various changes in form and details may be made therein without departing from the spirit and scope of the invention as defined by the following claims.

What is claimed is:

1. A fish eye lens system comprising, in an order from an object side to an image side:
    a first lens group having a negative refractive power;
    an aperture stop; and
    a second lens group having a positive refractive power,
    wherein the first lens group comprises, in the order from the object side to the image side, a (1-A)-th lens group consisting of a negative refractive power lens, a (1-B)-th lens group having a negative refractive power, and a (1-C)-th lens group comprising at least one positive lens,
    wherein the (1-B)-th lens group is moved to perform focusing,
    wherein the distance between the first lens group and the second lens group is reduced during zooming from a wide angle position to a telephoto position, and
    when the fish eye lens system performs zooming, the (1-A)-th lens group and the (1-C)-th lens group are moved simultaneously, and the (1-B)-th lens group is independently moved.

2. A fish eye lens system comprising, in an order from an object side to an image side:
    a first lens group having a negative refractive power;
    an aperture stop; and
    a second lens group having a positive refractive power,
    wherein the first lens group comprises, in the order from the object side to the image side, a (1-A)-th lens group consisting of a negative refractive power lens, a (1-B)-th lens group having a negative refractive power, and a (1-C)-th lens group comprising at least one positive lens, wherein the (1-B)-th lens group is moved to perform focusing, wherein the (1-A)-th lens group satisfies the following Equations:

$$0.5 < \frac{|Y_{G1}|}{Y_{Image}} < 2.0$$

$$0.1 < \left|\frac{f_{1-A}}{L}\right| < 0.5$$

where $Y_{image}$ is the height of a principal ray having a viewing angle of 180° at a photographing plane when an object distance is at infinity, $Y_{G1}$ is the height of a principal ray having a viewing angle of 180° at a first lens surface of the object side of the (1-A)-th lens group, $f_{1-A}$ is the focal length of the (1-A)-th lens group, and L is the distance from the first lens surface on the object side of the (1-A)-th lens group to an image plane.

3. A fish eye lens system comprising, in an order from an object side to an image side:
a first lens group having a negative refractive power;
an aperture stop; and
a second lens group having a positive refractive power,
wherein the first lens group comprises, in the order from the object side to the image side, a (1-A)-th lens group consisting of a negative refractive power lens, a (1-B)-th lens group having a negative refractive power, and a (1-C)-th lens group comprising at least one positive lens,
wherein the (1-B)-th lens group satisfies the following Equation:

$$0.2 < |(1-m_B^2) \cdot m_R^2| < 4.0$$

where $m_B$ is the combined magnification of the (1-B)-th lens group when a viewing angle of the fish eye lens is 180°, and $m_R$ is the combined magnification of the (1-C)-th lens group and the second lens group.

4. The fish eye lens system of claim 3, wherein the (1-B)-th lens group comprises a lens having a negative refractive power.

5. The fish eye lens system of claim 1, wherein the second lens group comprises at least one aspherical lens.

6. The fish eye lens system of claim 1, wherein the lens in the (1-A)-th lens group is a meniscus lens with a convex side toward the object side and has a negative refractive power.

7. The fish eye lens system of claim 1, wherein the (1-B)-th lens group comprises a meniscus lens with a convex side toward the object side and has a negative refractive power.

8. The fish eye lens system of claim 1, wherein the (1-B)-th lens group comprises a lens which has two concave sides and has a negative refractive power.

9. The fish eye lens system of claim 1, wherein the (1-C)-th lens group comprises a lens having a positive refractive power and a lens having a negative refractive power.

10. The fish eye lens system of claim 1, wherein the (1-C)-th lens group comprises a cemented lens comprising a lens having a positive refractive power and a lens having a negative refractive power.

11. The fish eye lens system of claim 1, wherein the second lens group comprises a cemented lens comprising either (i) a lens having a positive refractive power and a lens having a negative refractive power, or (ii) a cemented lens comprising a lens having a negative refractive power and a lens having a positive refractive power.

12. A photographing apparatus comprising:
a fish eye lens system; and
an imaging device that receives light passed through the fish eye lens system,
wherein the fish eye lens system comprises, in an order from an object side to an image side:
a first lens group having a negative refractive power;
an aperture stop; and
a second lens group having a positive refractive power,
wherein the first lens group comprises, in the order from the object side to the image side, a (1-A)-th lens group consisting of a negative refractive power lens, a (1-B)-th lens group having a negative refractive power, and a (1-C)-th lens group comprising at least one positive lens,
wherein the (1-B)-th lens group is moved to perform focusing, and
wherein the (1-A)-th lens group satisfies the following Equation:

$$0.5 < \frac{|Y_{G1}|}{Y_{Image}} < 2.0$$

$$0.1 < \left|\frac{f_{1-A}}{L}\right| < 0.5$$

where $Y_{image}$ is the height of a principal ray having a viewing angle of 180° at a photographing plane when an object distance is at infinity, $Y_{G1}$ is the height of a principal ray having a viewing angle of 180° at a first lens surface on the object side of the (1-A)-th lens group, $f_{1-A}$ is the focal length of the (1-A)-th lens group, and L is the distance from the first lens surface on the object side of the (1-A)-th lens group to an image plane.

13. A photographing apparatus comprising:
a fish eye lens system; and
an imaging device that receives light passed through the fish eye lens system,
wherein the fish eye lens system comprises, in an order from an object side to an image side:
a first lens group having a negative refractive power;
an aperture stop; and
a second lens group having a positive refractive power,
wherein the first lens group comprises, in the order from the object side to the image side, a (1-A)-th lens group consisting of a negative refractive power lens, a (1-B)-th lens group having a negative refractive power, and a (1-C)-th lens group comprising at least one positive lens,
wherein the (1-B)-th lens group is moved to perform focusing, and
wherein the (1-B)-th lens group satisfies the following Equation:

$$0.2 < |(1-m_B^2) \cdot m_R^2| < 4.0$$

where $m_B$ is the combined magnification of the (1-B)-th lens group when a viewing angle of the fish eye lens is 180°, and $m_R$ is the combined magnification of the (1-C)-th lens group and the second lens group.

14. The photographing apparatus of claim 13, wherein the (1-B)-th lens group comprises a lens having a negative refractive power.

* * * * *